Oct. 13, 1925.

F. J. GREENE 1,557,360

CROSSCUT SAW MECHANISM

Filed Feb. 15, 1924

INVENTOR.
Frederick J. Greene
BY
Erwin, Wheeler & Woolard
ATTORNEYS.

Patented Oct. 13, 1925.

1,557,360

UNITED STATES PATENT OFFICE.

FREDERICK J. GREENE, OF RACINE, WISCONSIN.

CROSSCUT-SAW MECHANISM.

Application filed February 15, 1924. Serial No. 692,993.

*To all whom it may concern:*

Be it known that I, FREDERICK J. GREENE, a citizen of the United States, residing at Racine, county of Racine, and State of Wisconsin, have invented new and useful Improvements in Crosscut-Saw Mechanisms, of which the following is a specification.

My invention relates to improvements in cross cut saw mechanisms.

The object of my invention is to provide a compact efficient and durable machine which can be constructed at minimum expense and operated with maximum efficiency and safety.

More particularly stated, the object is to provide a motor driven machine for operating a circular saw, the position of which may be manually controlled either by a suitable handle or by foot power. The motor is mounted upon the machine frame in such a manner that the device may be operated as a wholly independent power unit with the motor protected in part by portions of the housing mechanisms and so organized that it may be readily removed as an independent unit.

In the drawings.

Like parts are identified by the same reference characters throughout the several views.

Figure 1:
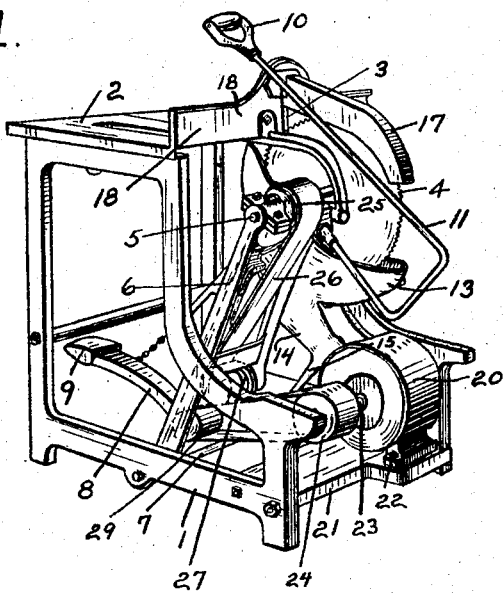
Figure 1 is a perspective view of saw mechanism embodying my invention.
Figure 2:
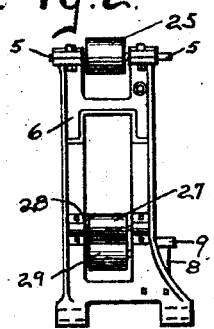
Figure 2 is a detail view of the supporting bracket in which the saw arbor is journalled.
Figure 3:
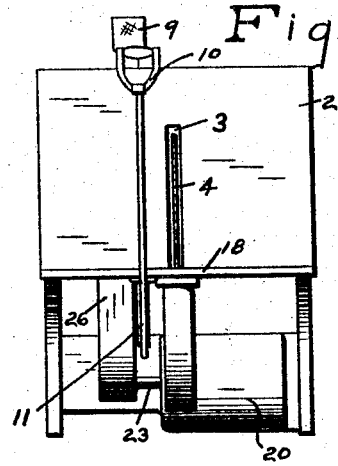
Figure 3 is a plan view with the saw in working position.

The frame 1 supports a table 2 having a slot 3 through which a circular saw 4 may be projected. The circular saw 4 is mounted on a shaft 5 journalled in a swinging bracket 6 pivotally mounted in the base of the frame by means of a cross shaft or trunnion 7. A foot lever or arm 8 provided with a pedal 9 may be utilized to swing the bracket 6 on its pivotal connection in a direction to carry the shaft 5 and saw 4 forwardly to working position with the saw projecting through the table slot 3, the saw swinging backwardly by gravity when pressure upon the foot pedal is relieved. The same swinging adjustment may be accomplished by pulling upon the handle 10, the latter being connected by rod 11 with the upper end portion of the bracket 6. A dust collector comprising the pan 13 is provided with a downwardly and laterally projecting spout 14 for the delivery of saw-dust at the side of the machine. This pan is supported by the bracket 6 and by brace 15 which connects it to the lower portion of the bracket. A channeled protecting guard 17 is secured to a vertical flange 18 on the table and partially encloses the upper portion of the saw, especially when the latter is in the retracted position in which it is shown in Figure 1.

The saw is driven from an electric motor 20. The frame is provided with a flat cross piece 21 which serves as a shelf and upon which the motor is mounted and secured in position by bolts 22. The motor has a short shaft 23 which is provided with a pulley 24. Motion is transmitted from the pulley 24 to a driven pulley 25 on the saw arbor or shaft 5 by means of a belt 26, the latter extending around a pulley 27. The supporting shaft 28 is journalled in suitable bearings carried by the lower end portion of the bracket 6 above and in close proximity to the axis upon which the bracket swings. On the return side, the belt 26 passes over a pulley 29.

The motor shown is an electric motor but the character of the motor is not material to this invention. When the bracket is swung to carry the saw to operating position, the upper pulley 27 moves forwardly and slightly increases its horizontal distance from the pulley 24. But it also moves upwardly to some extent and the pulley 25 moves toward a vertical line through the axis of pulley 27, thereby partially compensating for the increase in distance. The belt then operates with slightly increased tension to drive the saw in its working position—i. e.—in a position with the blade projected above the surface of the table 2 through the slot 3.

By pushing the handle 10 the saw may be instantly retracted. When both hands are occupied in holding the work, the saw may be advanced by pressure upon the foot pedal 9, the saw retracting automatically when released.

It will be observed that the motor is supported on the rear side of the saw partially underneath the dust collecting hood 13 and that it is not connected with the frame in any way except through the medium of the plate or platform 21, the latter serving also as a cross bar for the frame. The entire device as shown occupies a floor space having dimensions of approximately 3 x 3½ feet and is in the form of a self contained power unit. It may be moved from place to place and operated at any convenient point without limitation to the countershaft installation or other power transmitting connections of the shop.

I claim:

1. A circular saw mechanism comprising the combination with a supporting frame, a bracket pivotally connected to the base portion of the frame, a circular saw having an arbor journalled in the upper portion of the bracket, pulleys carried by said arbor and bracket, a motor supported on the rear portion of the frame and provided with a pulley in belted connection with the bracket pulleys and arbor pulley, and means for manually adjusting the bracket to swing the saw into and out of operative position from the side of the frame opposite to that at which the motor is located, said swinging bracket being also provided with a dust collecting pan having a laterally extending spout supported from the bracket and adapted to swing therewith.

2. In a device of the character described, a rotary member pivotally supported for oscillatory movement about such pivot, a dust collecting pan mounted for movement in synchronism with the oscillatory movement of said rotary member, said pan comprising a guard portion for one side of said rotary member and having a spout extending to one side of said pivotal support, whereby said pan will guard a portion of said rotary member and deposit dust generated by said rotary member to one side of said pivotal support.

3. In a device of the character described having a frame provided with a slotted work supporting table, the combination with a rotary member pivotally supported below said table and movable about said support into said slot, of a dust collecting pan surrounding that portion of said rotary member below said table and supported from said pivotal connection for oscillatory movement with said rotary member, said pan comprising a guard for said rotary member below said work supporting table and having an integral spout extending to one side of said frame, whereby said rotary member will be guarded below said table and dust will be deposited to one side of said frame.

FREDERICK J. GREENE.